(12) United States Patent
Jung et al.

(10) Patent No.: US 9,141,828 B2
(45) Date of Patent: Sep. 22, 2015

(54) MOBILE DEVICE MANAGEMENT APPARATUS AND METHOD BASED ON SECURITY POLICIES AND MANAGEMENT SERVER FOR MOBILE DEVICE MANAGEMENT

(75) Inventors: Hyun-Woo Jung, Seongnam-Si (KR); Jong-Sam Kim, Hwaseong-Si (KR); Ho-Young Son, Suwon-Si (KR); Ji-Joong Gil, Seoul (KR); Jin-Yong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 12 days.

(21) Appl. No.: 13/616,004

(22) Filed: Sep. 14, 2012

(65) Prior Publication Data
US 2013/0081104 A1    Mar. 28, 2013

(30) Foreign Application Priority Data

Sep. 23, 2011 (KR) .................... 10-2011-0096331

(51) Int. Cl.
| H04L 29/06 | (2006.01) |
| G06F 21/62 | (2013.01) |
| H04W 4/02 | (2009.01) |
| H04W 12/08 | (2009.01) |
| G06F 9/50 | (2006.01) |

(52) U.S. Cl.
CPC .............. *G06F 21/629* (2013.01); *H04L 63/20* (2013.01); *H04W 4/02* (2013.01); *H04W 12/08* (2013.01); *G06F 9/5011* (2013.01); *G06F 2221/2149* (2013.01); *H04L 2209/80* (2013.01)

(58) Field of Classification Search
CPC .......... G06F 21/629; G06F 2221/2149; H04L 63/20
USPC ............................................. 726/4
See application file for complete search history.

(56) References Cited

U.S. PATENT DOCUMENTS

| 6,381,639 B1 | 4/2002 | Thebaut et al. | |
| 8,385,916 B2 * | 2/2013 | Raleigh | ...................... 455/432.1 |
| 2003/0097590 A1 | 5/2003 | Syvanne | |

(Continued)

FOREIGN PATENT DOCUMENTS

| CN | 101557433 A | 10/2009 |
| KR | 10-2008-0070391 A | 7/2008 |

(Continued)

OTHER PUBLICATIONS

Communication dated Oct. 25, 2012 issued by the Korean Intellectual Property Office in counterpart Korean Application No. 10-2011-0096331.
Communication dated Jan. 18, 2013, issued by the European Patent Office in counterpart application No. 12 18 5321.

*Primary Examiner* — Dao Ho
(74) *Attorney, Agent, or Firm* — Sughrue Mion, PLLC (57) ABSTRACT

A mobile device management apparatus has a policy storage unit that receives a plurality of security policies, which are classified into a plurality of profiles assigned priorities of activation and in which operating states of functions of a mobile device are defined. A management server supplies the profiles and the security policies to the mobile device. A policy implementation unit selectively activates the profiles so that control of the mobile device functions can be carried out with minimal communication, and also in response to changing events.

17 Claims, 5 Drawing Sheets

(56) References Cited

U.S. PATENT DOCUMENTS

| | | | |
|---|---|---|---|
| 2004/0039594 A1 | 2/2004 | Narasimhan et al. | |
| 2008/0267144 A1* | 10/2008 | Jano et al. | 370/338 |
| 2009/0253455 A1* | 10/2009 | Huang | 455/550.1 |
| 2009/0325615 A1* | 12/2009 | Mckay et al. | 455/466 |

FOREIGN PATENT DOCUMENTS

| | | |
|---|---|---|
| KR | 1020090128979 A | 12/2009 |
| KR | 10-2010-0010902 A | 2/2010 |
| KR | 1020100069107 A | 6/2010 |
| WO | 2010071360 A2 | 6/2010 |

* cited by examiner

MOBILE DEVICE MANAGEMENT APPARATUS AND METHOD BASED ON SECURITY POLICIES AND MANAGEMENT SERVER FOR MOBILE DEVICE MANAGEMENT

CROSS-REFERENCE TO RELATED APPLICATION

This application claims priority to and the benefit of Korean Patent Application No. 2011-0096331, filed on Sep. 23, 2011, the disclosure of which is incorporated herein by reference in its entirety.

BACKGROUND

1. Field

Apparatuses and methods consistent with exemplary embodiments relate generally to a mobile device management apparatus and method based on security policies, and to a management server for mobile device management. More particularly, they relate to an apparatus and method in which methods of controlling a mobile device for respective situations are predefined as security policies and which control the mobile device depending on details defined in the security policies. Moreover, the security policies define building blocks that are used so as to define situationally sensitive sets called profiles. The profiles are developed in correspondence with a predicted situation. Whenever a situation occurs, the corresponding profile or profiles are activated. Apparatuses and methods consistent with exemplary embodiments also relate to an apparatus which creates, maintains and changes security policies used in defining the methods of controlling the mobile device for respective situations, and which controls the mobile device.

2. Description of the Related Art

Mobile devices today have processing power and, hence, capabilities that make them usable for productive work in business and governmental enterprises. This trend promises only to increase in the coming years as the performance of mobile devices continues to improve. A related development, still in relative infancy, is that enterprises are beginning to take advantage of the aforementioned trend by creating applications or programs for use on mobile devices, thus allowing the members of the enterprise to use the program in their productive work.

However, as this use of mobile devices for productive work has begun to grow, there are increasing concerns that the pervasive data sharing technologies of the modern age might make it possible or even likely that the internal data of the enterprise might be undesirably exposed outside of the enterprise. Coexistent with these concerns is, therefore, a heightened interest in preventing information leakage due to mobile devices, and in maintaining the security of mobile devices. To this end, some companies are requiring employee mobile devices to be excluded from the workplace. A more employee-friendly alternative, however, is to require any employee mobile devices (whether company-issued or privately obtained) brought into the workplace or used for work-related communications/data to be equipped with a company-controlled management application.

One example of such a management application used in managing mobile devices may be seen in Korean Patent Application Publication No. 2010-0069107. This publication describes a configuration in which a Device Management command, which is related to the function and management operation of a terminal, is transferred from a device management server to the terminal. The terminal stores the device management command. Once the terminal has reached a state satisfying some condition, the terminal executes the command. In another example, Korean Patent Application Publication No. 2008-0070391 describes a configuration in which a mobile terminal receives an external control command. The control command is used as an input to an engine that is loaded to apply the control command. In this configuration, the engine is activated, and then controls the terminal in compliance with the control command.

The two examples just discussed use an approach in which designated policies are transmitted to a terminal in the form of commands which are stored and implemented depending on conditions. In such an approach, however, a server can implement a changed policies only by resetting existing policies and transmitting to the mobile device the replacement commands that implement the changed policies. Thus, to change the details of control, that is, details of the policies, depending on variations in the environment of the mobile device, new commands must frequently be transmitted to the mobile device.

Therefore, in the just-mentioned examples of mobile device management techniques, the server must implement a security policy change by transmitting to the mobile device a new set of commands, a situation that imposes on the server and the mobile device a frequent need for the communication of replacement commands to handle the variety of different environments in which the mobile device may be used. Moreover, in the just-mentioned examples of management techniques, it is impossible for the mobile device itself to change and apply differing security policies or to set security policies that respond to various differing situations; that is to say, the mobile device is completely dependent upon the server to transmit commands necessary to implement a policy that relates to a situation or environment for which the current set of commands is not precisely what is desired.

SUMMARY

One or more exemplary embodiments may overcome the above disadvantages and other disadvantages not described above. However, it is understood that one or more exemplary embodiment are not required to overcome the disadvantages described above, and may not overcome any of the problems described above. According to one exemplary embodiment, there is provided a mobile device management apparatus and method based on security policies, which can control various types of functions of a mobile device without communicating with a server each time, previously set security policies corresponding to various situations and then adaptively implement the security policies in the mobile device.

According to another exemplary embodiment, there is provided a computer-readable storage medium that stores a program that can execute, on a computer, a mobile device management method based on security policies which can control various types of functions of a mobile device without communicating with a server each time, previously set security policies corresponding to various situations and then adaptively implement the security policies in the mobile device.

According to a further exemplary embodiment, there is provided a management server for mobile device management, which previously sets security policies corresponding to various situations of a mobile device and allows the mobile device to adaptively implement the security policies.

A mobile device management apparatus according to an exemplary embodiment includes a policy storage unit which receives security policies and profiles; the security policies each control an operation state with respect to a function of a mobile device; and the profiles comprise sets of one or more respective security policies and have respective activation priorities; and a policy implementation unit which selectively activates the profiles in response to one or more of: a detection of an event occurring on the mobile device, and a command received from outside the mobile device; the policy implementation unit executes the one or more respective security policies included in an activated profile so as to control the function of the mobile device.

A mobile device management method according to one exemplary embodiment includes (a) receiving a plurality of security policies classified into a plurality of profiles assigned activation priorities and in which operating states of functions of a mobile device are defined, and storing the security policies; and (b) activating profiles selected from the plurality of profiles in response to at least one of an event occurring on the mobile device and a command received from outside the mobile device, executing security policies included in the activated profiles, and then controlling the functions of the mobile device.

A management server according to one exemplary embodiment includes a policy creation unit that creates a plurality of security policies in which operating states of functions of a mobile device to be managed are defined, and classifying the security policies into a plurality of profiles respectively assigned priorities of activation; and a policy transmission unit that transmits the plurality of security policies classified into the plurality of profiles to the mobile device. In accordance with another exemplary embodiment, a mobile device includes a transmitter, a receiver, a storage, a management apparatus, and one or more mobile device functions. In this exemplary embodiment, the receiver receives a plurality of profiles; the profiles are stored in the storage; the profiles each include one or more security policies; each of the security policies pertains to an operation state of one of the mobile device functions; the storage also includes a plurality of event policies that define events and corresponding profiles; the management apparatus selectively activates ones of the profiles in response to at least one of: a detection of one of the defined events, and a command, received by the receiver, indicating one of the profiles to activate; and when the management apparatus activates one of the profiles, the management apparatus also executes the one or more security policies of the activated profile, and the executed security policies control the operation state of the mobile device functions.

BRIEF DESCRIPTION OF THE DRAWINGS

The above will be more clearly understood from the following detailed description taken in conjunction with the accompanying drawings, in which.

DETAILED DESCRIPTION

Hereinafter, exemplary embodiments of a mobile device management apparatus and method based on security policies and a management server for mobile device management will be described in detail with reference to the attached drawings.

Figure 1:
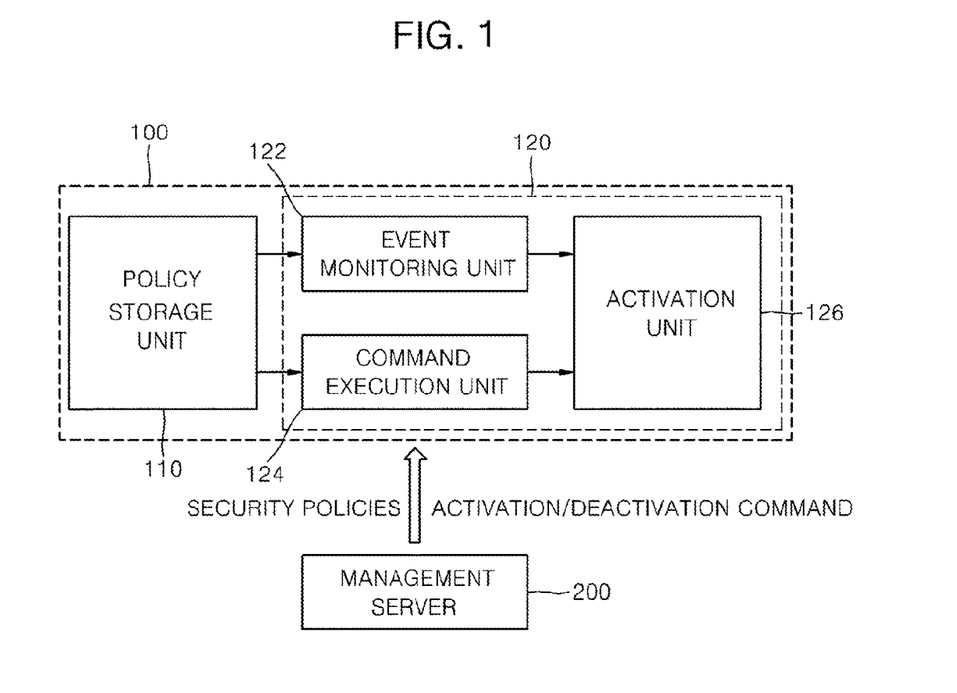
FIG. 1 is a block diagram showing the configuration of a mobile device management apparatus based on security policies according to an exemplary embodiment.

FIG. 1 is a block diagram showing the configuration of a mobile device management apparatus based on security policies according to an exemplary embodiment.

Referring to FIG. 1, a mobile device management apparatus 100 according to an exemplary embodiment includes a policy storage unit 110 and a policy implementation unit 120. The policy implementation unit 120 may perform functions using an event monitoring unit 122, a command execution unit 124, and an activation unit 126.

The mobile device management apparatus 100 according to an exemplary embodiment can be implemented inside a mobile device that is a target device to be controlled, and communicates with a management server 200 that remotely manages the operation of the mobile device. The management server 200 according to an exemplary embodiment manages and maintains security policies applied to the mobile device, and if necessary, transmits control commands or security policies to the mobile device, that is, the mobile device management apparatus 100 of an exemplary embodiment.

Further, the mobile device management apparatus 100 according to an exemplary embodiment can be used to control mobile devices of members belonging to the same organization. For example, in order to maintain security in a given enterprise such as a particular company, the mobile device management apparatus 100 according to an exemplary embodiment is installed in the mobile device of each member of the company, and is then capable of controlling the function of the mobile device of each member. In this case, the management server 200 can be provided either in the company or in a service provider that provides a security-related service.

Hereinafter, the case where the mobile device management apparatus 100 according to an exemplary embodiment is implemented to control the mobile device of each member belonging to a specific company is exemplified as a representative embodiment, and the operations of respective components will be described in detail.

Figure 2:
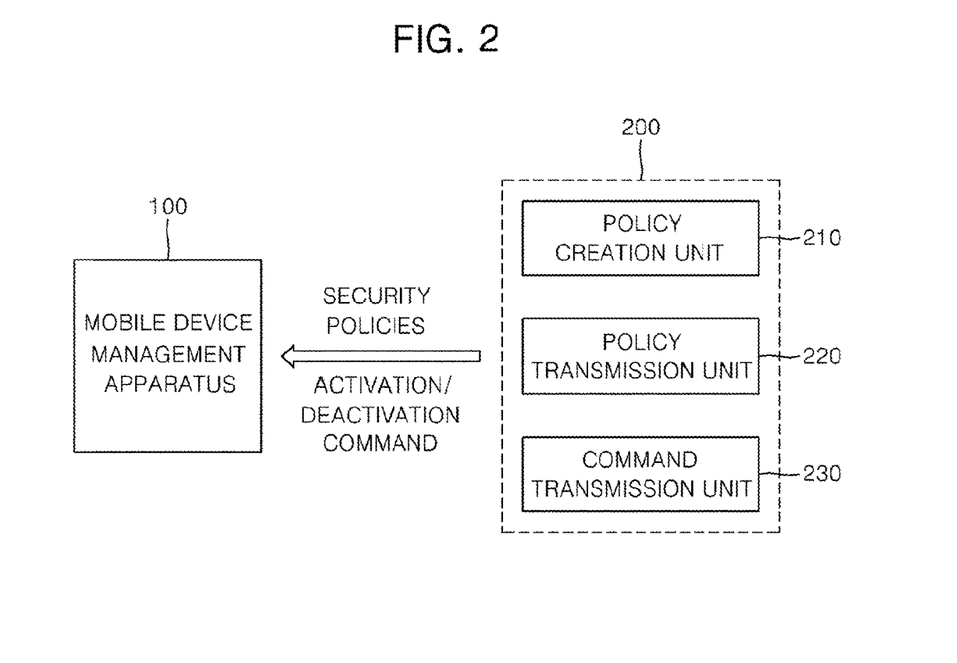
FIG. 2 is a block diagram showing the configuration of a management server according to an exemplary embodiment.

FIG. 2 is a block diagram showing the configuration of the management server 200 according to an exemplary embodiment.

Referring to FIG. 2, the management server 200 includes a policy creation unit 210, a policy transmission unit 220, and a command transmission unit 230. Detailed operations performed by the respective components of the management server 200 will be described together with the operations of the components of the mobile device management apparatus 100.

The policy storage unit 110 of the mobile device management apparatus 100 according to an exemplary embodiment receives a plurality of security policies, to which priorities of activation are assigned and in which operating states of the functions of the mobile device are defined, from the management server 200, and then stores the security policies.

The security policies stored in the policy storage unit 110 are created and transmitted by the policy creation unit 210 of the management server 200 so that operating states of various types of functions of the mobile device are defined. In particular, such functions may include, e.g., operational control of the camera, Wi-Fi, and Bluetooth, and execution control of screen lock and various types of software. The policy implementation unit 120 of the mobile device management apparatus 100 controls the functions of the mobile device depending on the details defined in the respective security policies. For example, if the interruption of a camera function is defined in a security policy activated by the policy implementation unit 120, the policy implementation unit 120 interrupts the camera function so that the user of the mobile device cannot use the camera function.

In this case, methods of interrupting or restoring individual functions are not limited to a single specific method, and all possible methods can be used. Further, a detailed method of controlling the functions of the mobile device can also be defined together with security policies, by a manager, when the security policies are created by the policy creation unit 210 of the management server 200.

There are a number of concrete ways, for example, to interrupt the availability of a resource such as a mobile device's camera. One approach is to preoccupy the resource. Under this approach, the policy functions so as to preoccupy the resource so that it is unavailable. Such an approach may be useful when there are various programs that use the corresponding function of the mobile device and it is difficult to restrict the execution of such programs. For example, in the case of the camera of the mobile device, when various programs requiring a camera function are executed, a specific broadcast intent does not occur, and there are a great variety of programs that use the camera function. Therefore, when the policy implementation unit 120 activates a security policy in which the interruption of the camera function is defined, it can preoccupy camera resources of the system, thus preventing programs requiring the camera function from being executed.

Another approach to controlling the functions of the mobile device is a broadcast monitoring method. The broadcast monitoring method is configured to use a broadcast intent that occurs when the specific function of the mobile device is executed. For example, in the case of a Bluetooth function, when an operation, such as activation, pairing, or connection occurs, the system automatically transmits a broadcast intent. Accordingly, the policy implementation unit 120 detects the broadcast intent, and is then capable of interrupting the Bluetooth function or not, in accordance with the security policy. Such a broadcast monitoring method can be applied to micro Secure Digital (microSD), Wi-Fi, and tethering functions of the mobile device, as well.

Further, the policy implementation unit 120 can control the functions of mobile device using a thread monitoring approach. This approach can be used when resources cannot be preoccupied, and when a specific event broadcast such as a broadcast intent is not used. For example, whether a software program that must always be executed on the mobile device has terminated or is continuously being executed can be monitored using a thread. In addition to the foregoing approaches, others may be used as the situation requires.

Security policies defined to control various types of functions of the mobile device, using the above-described various methods, are created by the policy creation unit 210 of the management server 200. Thereafter, the details of security policies are maintained and updated while the security policies are being continuously managed. Further, when it is desired to control the mobile device of each member in a company, the policy creation unit 210 adaptively creates security policies in conformity with detailed personal information about each member, for example, information about the department and position of the member, based on the settings of the manager. The policy transmission unit 220 transmits the security policies adaptively created in this way to the mobile device management apparatus 100 installed in the mobile device of each member. Thus, a particular set of security policies may be selected for a user's mobile device based on information about the user's position or role within an organization. To put it another way, the set of security policies downloaded to a user's mobile device may be based on organizational information pertaining to the user.

As described above, the policy creation unit 210 generally creates security policies that define the operating states (e.g., fully operational, non-operational, or operational to a specified degree) of various functions (e.g., camera, Wi-Fi, Bluetooth, various applications) of the mobile device. In addition to the security policies, the policy creation unit 210 can also create event policies that define triggers for which the security policies are activated on the mobile device. The event policies define the events (such as occurring on the mobile device or previously set emergency events) and the identification codes of profiles (profiles are described immediately below) to be activated in accordance with the respective events. The control of the mobile device based on the activation of event policies will be described in detail later.

The security policies created by the policy creation unit 210 can be classified into a plurality of profiles. Each profile pertains to a group or a set of one or more security policies. Security policies belonging to the same profile are simultaneously activated or deactivated. Each profile is assigned an identification code and an activation priority. In the event that more than one activated profile includes a respective security policy that relates to the same function of a mobile device, the respective activation priorities of the profiles are used to determine the profile whose security policy is to be followed. In one exemplary embodiment, priorities are assigned as numbers, with a smaller number indicating a higher priority.

For example, profiles A and B both include a security policy that relates to the camera function of a mobile device. In profile A, the security policy for the camera function defines the operating state as non-operational for the camera, i.e., for interrupting a camera function. In profile B, the security policy for the camera function defines an operational state for the camera, i.e., for releasing the interruption of the camera function. Profile A has a priority of 1, and profile B has a priority of 2. If both of the two profiles are activated at the same time, the security policies for the camera function, defined in profiles A and B, would seem to conflict. In such a situation, the policy implementation unit 120 would implement the security policy in profile A which interrupts the camera function since profile A has the higher respective priority.

In this way, the configuration in which the policy creation unit 210 of the management server 200 creates a plurality of security policies defining various operations related to the same function of the mobile device and classifies the security policies into a plurality of profiles fulfills the necessity of causing the individual functions of the mobile device to be controlled differently depending on various situations related to the mobile device.

As described above, in the past, there was a problem in that a new control command must be transmitted to the mobile device each time it was desired to change operating state of an individual function of the mobile device. However, the policy creation unit 210 of the management server 200 according to an exemplary embodiment creates a plurality of profiles in consideration of various situations in which the individual functions of the mobile device can be differently controlled, and each profile includes one or more respective security policies that can be simultaneously activated.

In the mobile device that received the security policies via the above procedure, the policy implementation unit 120 of the mobile device management apparatus 100 according to an exemplary embodiment controls the functions of the mobile device by activating profiles suitable for respective situations, thus reducing the cost of data communication between the mobile device and the server and improving the flexibility and facilitation of the configuration of security policies.

Furthermore, the policy creation unit 210 can further classify a plurality of profiles, each including a plurality of security policies, into a plurality of layers, wherein the respective layers can be assigned priorities of implementation. The policy transmission unit 220 transmits the security policies classified for respective layers and respective profiles to the mobile device. The policy storage unit 110 of the mobile device management apparatus 100 according to an exemplary embodiment maintains the classification of the security policies for respective layers and respective profiles, transmitted from the policy transmission unit 220, and stores the classified security policies.

The layers into which the profiles are classified can be divided into a first layer including profiles that must always be maintained in an activated state by the policy implementation unit 120, and a second layer including profiles that have a higher implementation priority than that of the first layer and that are selectively activated or deactivated by the policy implementation unit 120.

Since the profiles of the first layer are always activated on the mobile device, the above-described event policies are created by the policy creation unit 210 so that they are included only in the profiles of the first layer. Further, the profiles defined in accordance with respective events in the event policies correspond to only profiles included in the second layer. The reason for this is that the profiles of the first layer are always activated regardless of the occurrence of events. Another way to put this is that the first layer defines a default profile, while the second layer defines event-driven profiles.

That is, if a security process for the mobile device is initiated after the security policies received from the management server 200 have been stored for respective layers and respective profiles in the policy storage unit 110, the policy implementation unit 120 first activates the profiles of the first layer and allows the profiles to always be maintained in the activated state. If an event defined in the event policies occurs on the mobile device, the policy implementation unit 120 activates a profile having the identification code defined in response to the event.

The profiles included in the second layer may be activated or deactivated by the policy implementation unit 120 in response to an event that has occurred on the mobile device among the events defined in the above-described event policies, or an activation/deactivation command transmitted from the command transmission unit 230 of the management server 200.

Figure 3:
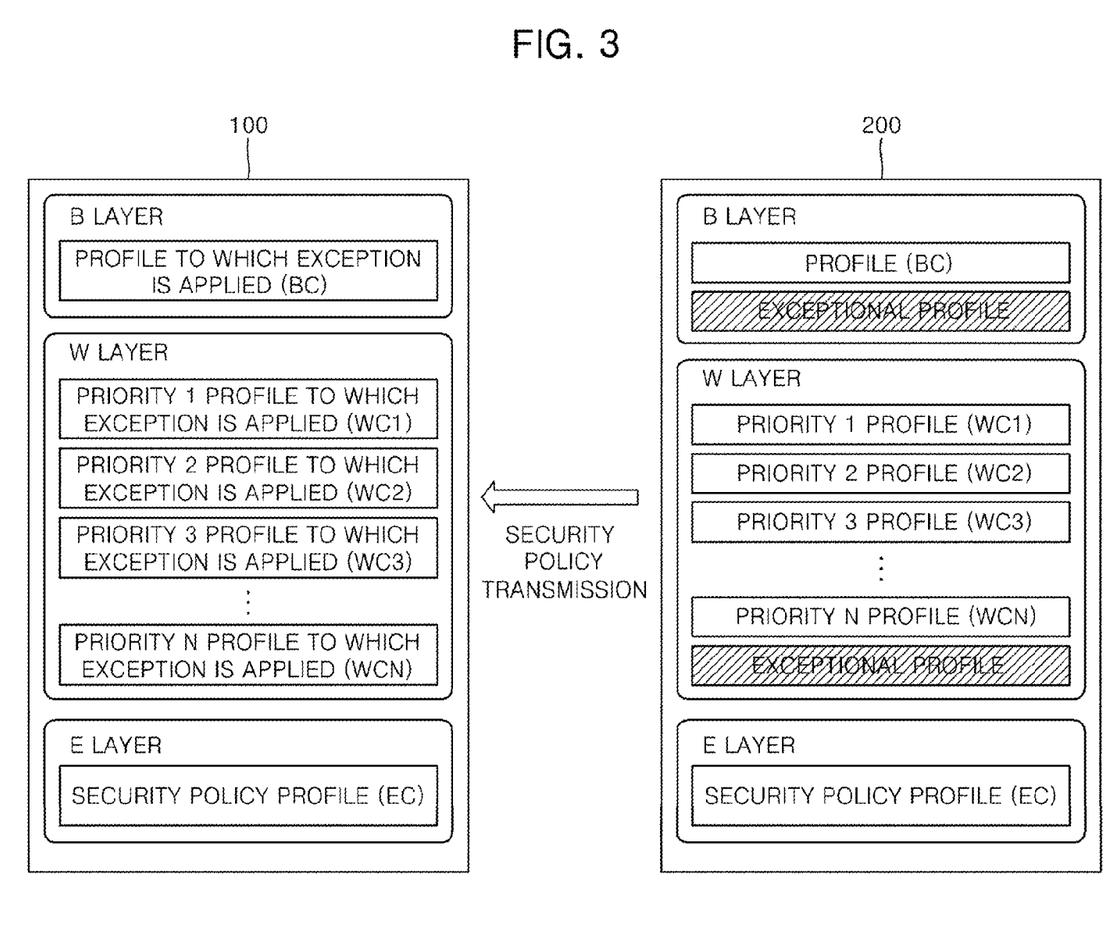
FIG. 3 is a diagram showing an exemplary embodiment of the classification of security policies, created by the policy creation unit of the management server and stored in the policy storage unit of the mobile device management apparatus, for respective layers and respective profiles.

FIG. 3 is a diagram showing an exemplary embodiment of the classification of security policies, created by the policy creation unit 210 of the management server 200 and stored in the policy storage unit 110 of the mobile device management apparatus 100, for respective layers and respective profiles. In FIG. 3, the drawing of the security policies that are included in each profile is omitted.

The profiles shown on the right side of FIG. 3 are intended to represent sets of security policies created by the policy creation unit 210 of the management server 200, and the profiles shown on the left side of FIG. 3 are intended to represent sets of security policies as stored in the policy storage unit 110 of the mobile device management apparatus 100.

Referring to FIG. 3, the plurality of profiles, each of which includes including a plurality of security policies, is classified into multiple layers. In this example, the plurality of profiles are classified into a Base (B) layer, a Wrapper (W) layer, and an Emergency (E) layer. The B layer is a layer including one or more profiles that are always maintained in an activated state in the mobile device, and corresponds to the above-described first layer. Further, the W layer is a layer including profiles that are activated or deactivated in response to the occurrence of an event defined in event policies included in the profiles of the B layer, or a command from the management server 200, and corresponds to the above-described second layer.

Meanwhile, in the layers shown in FIG. 3, the E layer according to one exemplary embodiment is further included in addition to the B layer and the W layer. The E layer is a layer including one or more profiles that are activated in response to the occurrence of a preset emergency event among the events defined in the event policies, that is, an event that does not occur during the normal operation of the mobile device and that indicates an urgency/emergency situation. The E layer has a priority of implementation higher than those of the B layer and the W layer.

According to an exemplary embodiment, the B and W layers of the management server 200 each include an 'exceptional profile' in addition to the profiles that have security policies. The exceptional profile is composed of any security policies set on an ad hoc basis or on an institutional basis by the manager; this provides for convenience and flexibility in the management of mobile devices. For example, when mobile devices are classified into and managed in a plurality of groups (based, e.g., on specific criteria such as department, work site, or the like), exceptional control operations required for the functions of the mobile devices for respective groups can be defined as security policies and can be included by way of the exceptional profile. Such an exceptional profile can be set even in the case where an exceptional control operation is required for the mobile device of a specific user, as well as the group-based control of mobile devices. Thus, the exceptional profiles may be used by the management server 200 to modify the basic profiles so that a mobile device belonging to a group has profiles to which particular exceptions are applied.

The policy creation unit 210 of the management server 200 creates normal security policies depending on the settings of the manager, classifies the security policies for respective profiles and layers, and creates exceptional profiles for the profiles included in the B layer and the W layer. If the access of a mobile device has been determined, the policy transmission unit 220 applies the security policies of the exceptional profiles to the profiles included in the individual layers on the basis of the user information of the mobile device, and transmits resulting profiles to the mobile device. Accordingly, the policy storage unit 110 of the mobile device management apparatus 100 stores profiles, to which exceptional processing has already been applied, for respective layers.

In the B and E layers in the policy storage unit 110, only a single respective profile is included. However, since the profiles of the W layer are selectively activated/deactivated in response to the occurrence of an event or a command from the management server 200, a plurality of profiles is stored in the W layer so that various situations of the mobile device can be incorporated into the profiles. In FIG. 3, profiles included in the B layer and the E layer are assigned only identification codes BC and EC, respectively. The profiles included in the W layer are assigned activation priorities 1 to N together with the respective identification codes WC. In an exemplary embodiment, the lower the activation priority number, the higher the relative priority.

Hereinafter, a detailed operation will be described, in which the policy implementation unit 120 of the mobile device management apparatus 100 activates/deactivates the profiles stored in the policy storage unit 110 in response to the occurrence of an event defined in event policies or a command transmitted from the management server 200.

First, as described above, the activation unit 126 of the policy implementation unit 120 automatically activates the profile of the B layer profile stored in the policy storage unit 110 when the security process for the mobile device is initiated. For example, the security policies included in the profile of the B layer are related to the availability of a camera function, a Wi-Fi function, a social application such as TWITTER, and access to the microSD. In this example, the B layer profile contains security policies that indicate the operational availability of the camera, the Wi-Fi, and the microSD, and the operational unavailability of social applications. As event policies, a work program execution event and a V3 program deletion event on the mobile device are individually defined.

Further, a WC1 profile having the highest priority among the profiles of the W layer includes security policies that provide for the operational availability of a camera, the operational unavailability of the Wi-Fi function, and the operational availability of microSD. A WC2 profile, which has a priority lower than that of the WC1 profile, includes security policies that provide for the operational unavailability of the camera, the Wi-Fi function, and the microSD. Meanwhile, the profiles of the E layer include security policies provide for the operational unavailability of the camera, the Wi-Fi function, the microSD, Bluetooth communications, and tethering, as well as the operational implementation of terminal locking.

The profiles of the B layer are activated in the beginning, and so at that time the activation unit 126 controls the functions of the mobile device depending on the security policies included in the profiles of the B layer. Thereafter, the event monitoring unit 122 of the policy implementation unit 120 calculates activation indices assigned to the respective profiles depending on the initiation and the termination of events occurring on the mobile device.

Activation indices are respectively assigned to the profiles stored in the policy storage unit 110. The activation indices are used to determine, or keep track of, whether the profiles have been activated. The event monitoring unit 122 increases the activation index of each profile defined as being activated in response to a corresponding event defined in event policies if the event has occurred, and decreases the activation index of the defined profile in response to the corresponding event if the event has terminated.

Preferably, the event monitoring unit 122 can increase or decrease the activation index of each profile by 1 whenever an event occurs and terminates. Further, when a single profile simultaneously corresponds to two or more events, and all of the corresponding events occur, the activation index of the corresponding profile is increased by the number of events that occurred. Thus, the occurrence of two events that activate a given profile, followed by the termination of one of the two events, results in the continued activation of the profile until the termination of the other of the two events.

As in the case of the example of the above-described event policies, sensing the execution of a work program installed on the mobile device means that the user of the mobile device accesses the work-related server of the company using the mobile device, so that there is a need to activate a profile for restricting various types of functions of the mobile device. In this case, an execution event for the work program corresponds to the WC2 profile among the profiles in the W layer.

Therefore, the event monitoring unit 122 increases the activation index of the WC2 profile defined in accordance with the execution event for the work program. Further, when the work program is terminated on the mobile device, the activation index of the WC2 profile is decreased.

Meanwhile, among the event policies exemplified above, a V3 program deletion event on the mobile device corresponds to an emergency event, and the profile defined in accordance with the emergency event is the profile of the E layer. When an event for deleting the V3 program occurs on the mobile device, the event monitoring unit 122 increases the activation index of the profile of the E layer corresponding to the event by 1. To summarize, therefore, each profile has a respective activation priority and also a respective activation index; the activation priority does not change in the exemplary embodiments mentioned above, but the activation index changes in response to the occurrence and the termination of predetermined events.

The command execution unit 124 calculates the activation index of each profile based on the detection of an activation or deactivation command transmitted from the management server 200. In detail, the activation or deactivation command is transmitted from the command transmission unit 230 of the management server 200. An example in which the management server 200 transmits an activation or deactivation command includes the case where the mobile device enters a specific area.

Whether the mobile device has entered a specific area can be determined in a number of ways. For example, when the user of the mobile device uses his or her pass card (or the mobile device itself as a pass card) at an entry point gate, it may be assumed that the mobile device has entered the specific area. In another example, the presence of a mobile device can be determined through a manual operation of the manager. The fact of the entrance of the mobile device is transferred to the management server 200, and the command transmission unit 230 of the management server 200 transmits an activation command for a specific profile, for example, the WC1 profile of the W layer, to the corresponding mobile device. The command execution unit 124 increases the activation index of the WC1 profile in compliance with the transmitted activation command.

Figure 4:
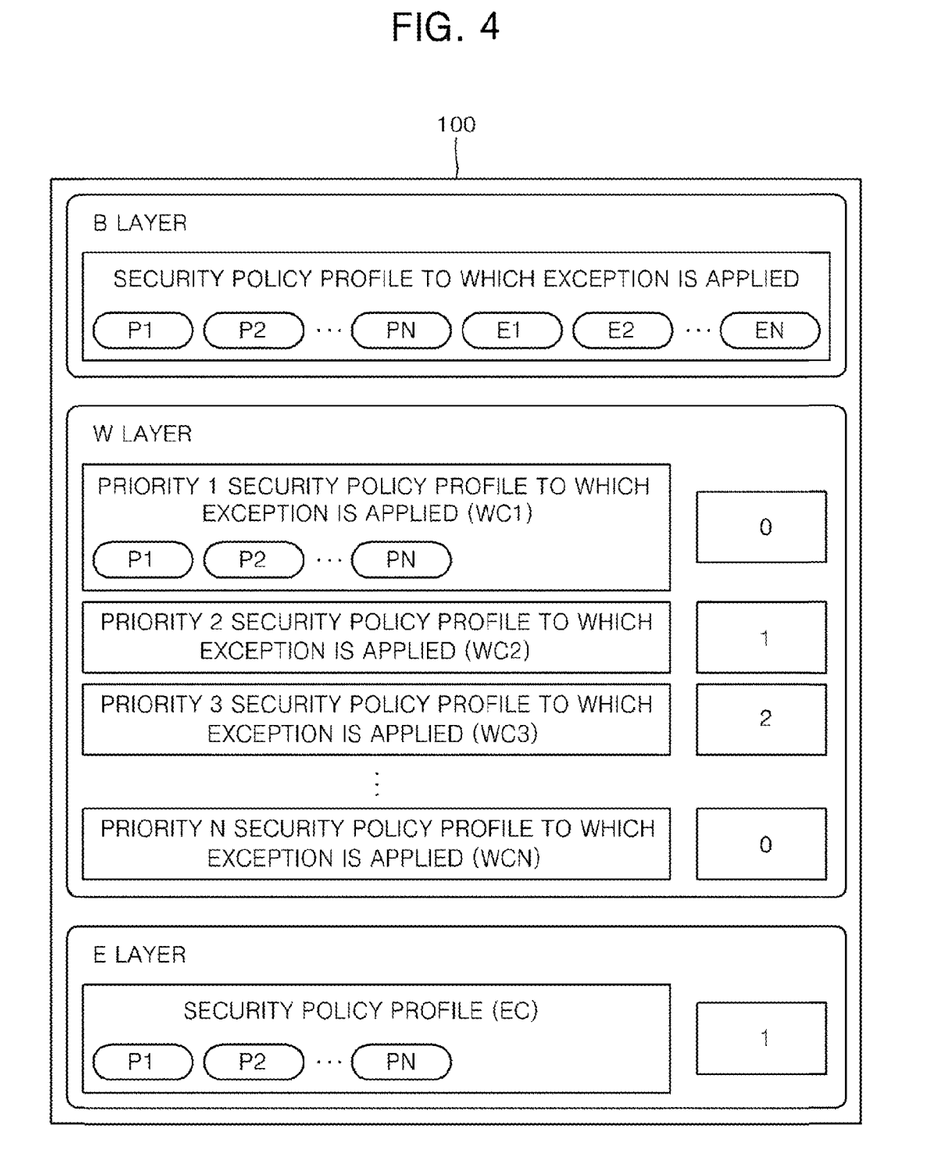
FIG. 4 is a diagram showing an example of the calculation of activation indices of respective profiles stored in the policy storage unit.

FIG. 4 is a diagram showing an example in which the activation index of each profile stored in the policy storage unit 110 is calculated. Referring to FIG. 4, the profile of the B layer is always active regardless of whether an event has occurred or whether a command has been transmitted from the management server 200. Accordingly, a separate activation index need not be assigned to the profile of the B layer, and so activation indices are calculated only for the profiles of the W layer and the E layer.

The calculation of the activation indices is performed by the event monitoring unit 122 and the command execution unit 124. In the example of FIG. 4, the activation indices are increased or decreased by 1 in response to the occurrence of an event or the transmission of a command from the management server 200. Among the profiles of the W layer, the activation index of the WC3 profile being 2 means that the occurrence of an event defined in accordance with the profile or the activation command of the corresponding profile has occurred more than once.

The activation unit 126 activates profiles for which the activation indices are equal to or greater than a preset reference value, for example, 1. The activation unit 126 implements the security policies included in the activated profile. That is, in the example shown in FIG. 4, since the activation indices of the WC2 and WC3 profiles and the EC profile of the E layer are equal to or greater than 1, those profiles are activated by the activation unit 126 (the B layer profile is always active).

As described above, more than one active profile can include a security policy that relates to an operation state of the same mobile device function. Therefore, the activation unit 126 resolves such a situation based on the respective activation priorities of the active profiles. The security policy that is implemented is the one that is in the profile having the highest activation priority.

Figure 5:
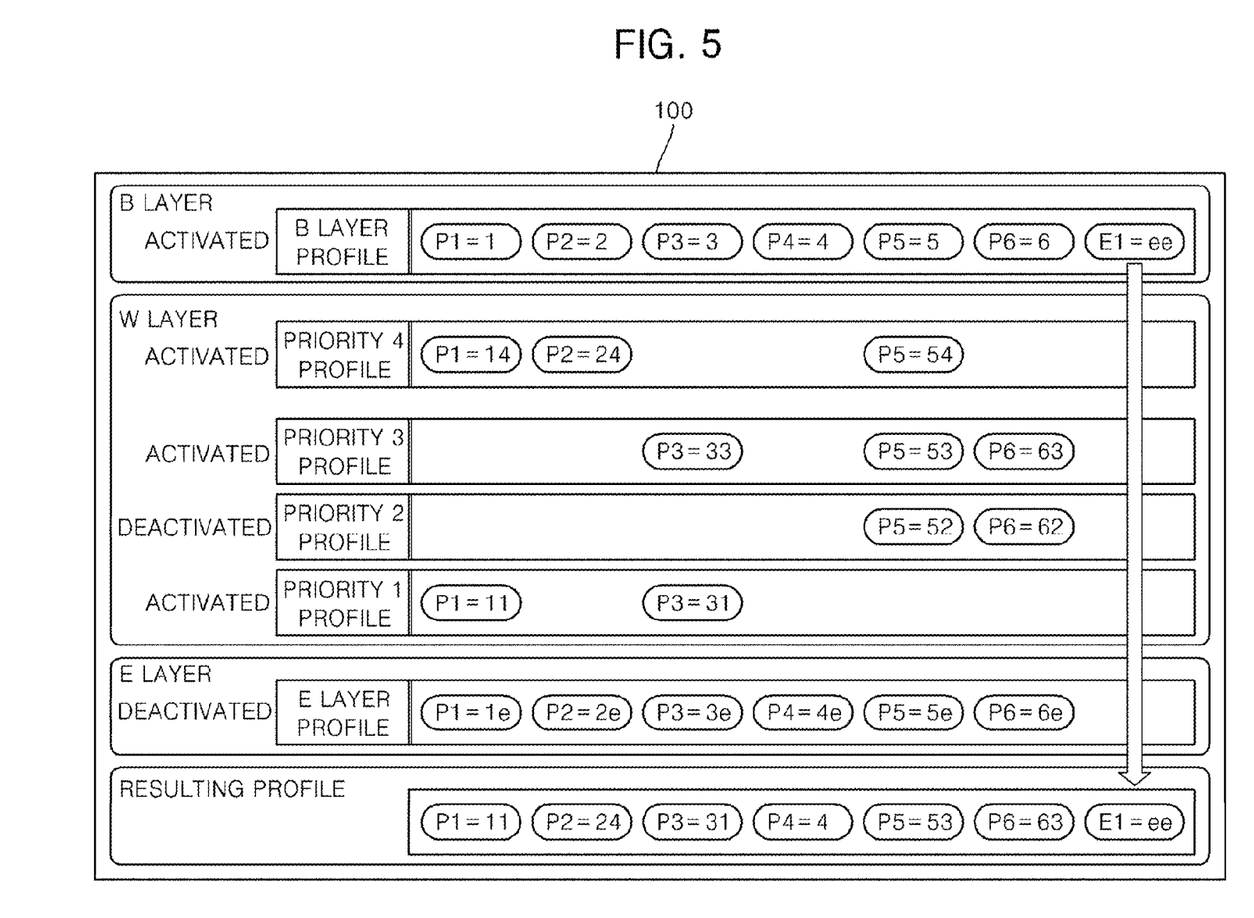
FIG. 5 is a diagram showing an example in which an activation unit determines policy values of respective security policies in consideration of the priorities of activated profiles.

FIG. 5 is a diagram showing an example in which the activation unit 126 determines policy values of respective security policies in consideration of the priorities of activated profiles.

Referring to FIG. 5, in the current state of a mobile device, the profile of the B layer is active by default, the WC1, WC3 and WC4 profiles of the W layer are activated, and the profile of the E layer is deactivated. Further, the security policies included in each profile have respective security policy identification codes and particular policy values. The policy values relate to different operation states for a function of the mobile device, and may be thought of as a type of parameter. Such a policy value is a value indicating an operating state in which the function of the mobile device designated by the corresponding security policy is to be controlled, and this value can be set by the manager. In more detail, the B layer includes a security policy with an identification code of P1. This security policy relates to a function of the mobile device. The P1 security policy also is present in the WC4, WC1, and E profiles. In the B layer profile, however, the policy value of the P1 security policy is 1, but in the WC4 profile, the policy value of the P1 security policy is 14. In the WC1 profile, the policy value of the P1 security policy is 11.

The activation unit 126 determines the policy values of respective security policies included in the profile of the B layer and then generates a resulting profile. In detail, the P1 security policy of the B layer is simultaneously included in the WC1 and WC4 profiles activated in the W layer. Among the three profiles, the priority of the WC1 profile is the highest, so that the policy value, that is, 11, of the P1 security policy included in the WC1 profile can be determined to be a final policy value. In other words, for the P1 security policy, the activation unit 126 adopts a policy value of 11 because this is the policy value for the security policy in the profile having the highest activation priority, namely, profile WC1.

The activation unit 126 repeatedly performs the above procedure even on the P2 to P6 security policies, and then generates a resulting profile composed of security policies, the final policy values of which have been determined. In this case, the E1 event policy included in the profile of the B layer is incorporated into the resulting profile without being changed.

Meanwhile, the event monitoring unit 122 and the command execution unit 124 update the activation indices of respective profiles in real time depending on whether an event defined in the event policies has occurred, or whether a command has been transmitted from the management server 200.

The updated activation indices are input to the activation unit 126, and the activation unit 126 re-performs the above-described procedure of activating profiles and setting policy values of the security policies based on the updated activation indices.

Figure 6:
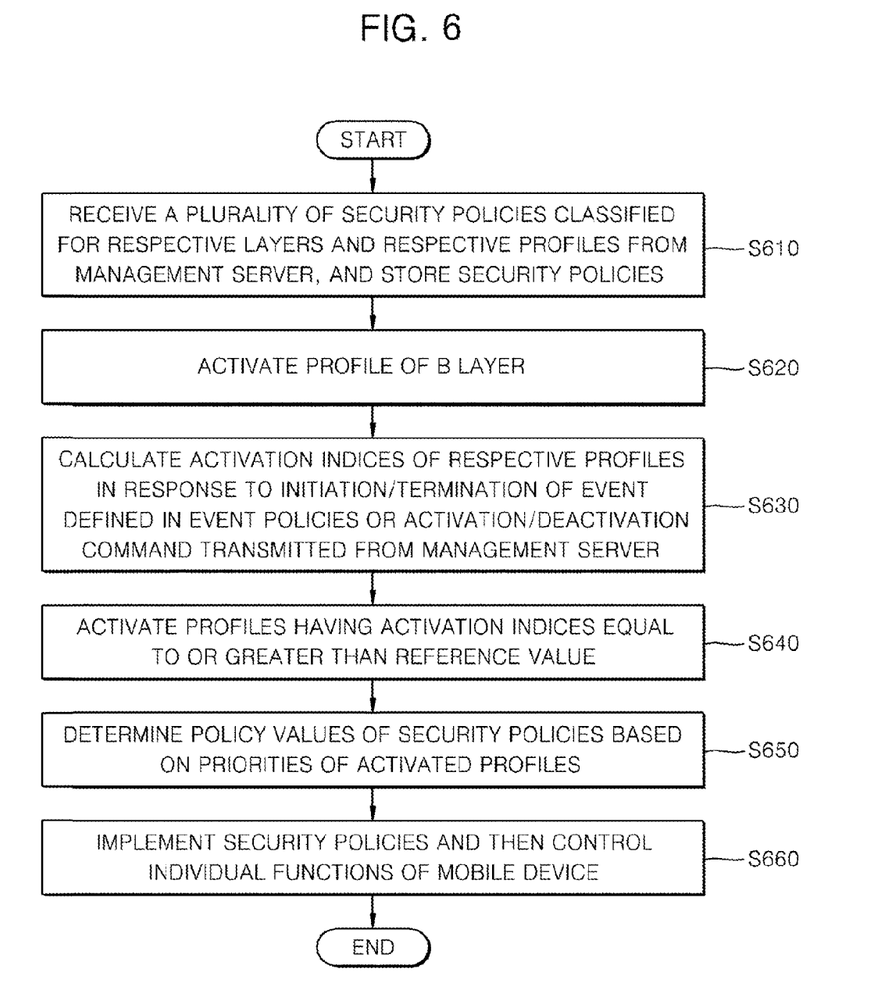
FIG. 6 is a flowchart showing a process for performing a mobile device management method based on security policies according to an exemplary embodiment.

FIG. 6 is a flowchart showing a process for performing a mobile device management method based on security policies according to an exemplary embodiment.

Referring to FIG. 6, when the mobile device accesses the management server 200, the policy transmission unit 220 of the management server 200 classifies security policies created by the policy creation unit 210 for respective layers and respective profiles, and transmits the classified security policies to the mobile device management apparatus 100, and the policy storage unit 110 stores the received security policies at step S610. These profiles constitute sets of predetermined security policies.

Thereafter, the activation unit 126 of the policy implementation unit 120 first activates the profile of the B layer among a plurality of layers, thus allowing the profile of the B layer to always be activated at step S620. Next, the event monitoring unit 122 and the command execution unit 124 individually increase or decrease the activation indices of the corresponding profiles in response to the initiation and termination of an event defined in the event policies included in the profile of the B layer, or activation and deactivation commands transmitted from the management server 200 at step S630.

The activation unit 126 activates profiles, the activation indices of which are equal to or greater than a preset reference value, based on the calculated activation indices at step S640, and then determines the policy values of the security policies, that is, methods of controlling the functions of the mobile device, with reference to the priorities of the activated profiles at step S650. Finally, the activation unit 126 implements security policies, the policy values of which have been determined, and then controls the individual functions of the mobile device at step S660. This process, although illustrated in FIG. 6 in highly simplified schematic form, will be repeated with step S630 in accordance with the ability of the mobile device to detect changes in events or state.

An exemplary embodiment may be implemented in a computer-readable storage medium in the form of computer-readable code. The computer-readable storage medium includes all types of storage devices in which computer system-readable data is stored. Examples of the computer-readable storage medium are Read Only Memory (ROM), Random Access Memory (RAM), Compact Disk-Read Only Memory (CD-ROM), magnetic tape, a floppy disk, and an optical data storage device. All of the foregoing may be understood to constitute non-transitory types of media. Moreover, the computer-readable medium may be distributed across computer systems connected via a network, so that computer-readable code can be stored and executed in a distributed manner.

As described above, the mobile device management apparatus and method based on security policies and the management server for mobile device management according to an exemplary embodiment are configured such that security policies differently defined depending on various possible situations for a mobile device are previously created and stored in the mobile device, and thereafter the functions of the mobile device are adaptively controlled. Accordingly, there are advantages in that whenever the details of each security policy are changed, communication cost required for the management server to transmit a new security policy to the mobile device can be reduced, and in that the mobile device can independently and adaptively control the functions thereof.

Although various exemplary embodiments have been disclosed for illustrative purposes, those skilled in the art will appreciate that various modifications, additions and substitutions are possible, without departing from the scope and spirit of the inventive concept as defined in the accompanying claims.

What is claimed is:

1. A mobile device management apparatus comprising:
    at least one processor operable to read and operate according to instructions within a computer program; and
    at least one memory operable to store at least portions of said computer program for access by said processor;
    wherein said program includes algorithms to cause said processor to implement:
        a policy storage unit which receives security policies and profiles; wherein the security policies each control an operation state with respect to a function of a mobile device; and wherein the profiles comprise sets of one or more respective security policies and have respective activation priorities; and
        a policy implementation unit which selectively activates the profiles in response to one or more of:
            a detection of an event occurring on the mobile device, and
            a command received from outside the mobile device;
    wherein the policy implementation unit is executed on the mobile device and executes the one or more respective security policies included in an activated profile so as to control the function of the mobile device;
    wherein each profile is assigned an activation index, and the policy implementation unit activates a profile of which the activation index is greater than a preset value,
    wherein, when two or more events are defined with a corresponding profile in the policy storage unit, an activation index of the corresponding profile increases according to a number of events, among the two or more events, occurring on the mobile device, and
    wherein, when the function of the mobile device is controlled by more than one of the security policies, the policy implementation unit executes only the one of the security policies belonging to a profile having a higher respective activation priority.

2. The mobile device management apparatus of claim 1, wherein:
    the profiles are classified into and stored in layers having respective activation priorities, and
    when the same function of the mobile device is controlled by more than one of the security policies, the policy implementation unit executes only the one of the security policies belonging to the layer having a higher respective activation priority.

3. The mobile device management apparatus of claim 2, wherein the layers comprise a first layer including a profile of security policies that are always maintained in an activated state, and a second layer including event-driven profiles that have a higher priority of implementation than that of the first layer;
    wherein the event-driven profiles are capable of being activated also by the command received from outside the mobile device.

4. The mobile device management apparatus of claim 3, wherein the layers further comprise a third layer including profiles that are activated in response to a preset emergency event.

5. The mobile device management apparatus of claim 4, wherein:
    the profile in the first layer further includes event policies in which the event occurring on the mobile device or the emergency event and identification codes of profiles activated in response to each event are defined, and
    the policy implementation unit activates profiles of the second and third layers in response to occurrence of the event defined in the event policies.

6. The mobile device management apparatus of claim 1, wherein:
    the policy implementation unit comprises:
        an event monitoring unit for calculating activation indices assigned to the respective profiles depending on initiation and termination of the event occurring on the mobile device;
        a command execution unit for calculating activation indices assigned to the respective profiles in response to an activation or deactivation command received from outside the mobile device; and
        an activation unit for activating profiles, activation indices of which are equal to or greater than a preset reference value, based on the activation indices of the respective profiles calculated by the event monitoring unit and the command execution unit.

7. The mobile device management apparatus of claim 6, wherein, when updated activation indices are input from the event monitoring unit or the command execution unit, the activation unit reselects profiles to be activated based on the updated activation indices.

8. A mobile device management method comprising:
    (a) receiving a plurality of security policies classified into a plurality of profiles assigned activation priorities and in which operating states of functions of a mobile device are defined, and storing the security policies at the mobile device; and
    (b) activating, by the mobile device, profiles selected from the plurality of profiles in response to at least one of an event occurring on the mobile device and a command received from outside the mobile device, executing security policies included in the activated profiles, and then controlling the functions of the mobile device,
    wherein each profile is assigned an activation index, and the policy implementation unit activates a profile of which the activation index is greater than a preset value,
    wherein, when the security policies are stored with a definition of two or more events with respect to a corresponding profile at the mobile device, an activation index of the corresponding profile increases according to a number of events, among the two or more events, occurring on the mobile device, and
    wherein (b) is carried out so that, when a plurality of security policies, in which operating states of an identical function of the mobile device are defined, is individually included in the plurality of activated profiles, a security policy included in a profile having a highest priority of activation among the activated profiles is implemented.

9. The mobile device management method of claim 8, wherein:
    the plurality of profiles is classified into and stored in a plurality of layers respectively assigned priorities of implementation, and
    (b) is carried out so that, when the plurality of security policies, in which the operating states of the identical function of the mobile device are defined, is individually included in the plurality of layers, implement a security policy of a profile included in a layer having a highest priority of implementation among the activated profiles.

10. The mobile device management method of claim 9, wherein the plurality of layers comprises a first layer including a profile that is always maintained in an activated state, and a second layer including profiles that have a higher priority of implementation than that of the first layer and that are activated in response to the event occurring on the mobile device or the command received from outside the mobile device.

11. The mobile device management method of claim 10, wherein the plurality of layers further comprises a third layer that includes profiles activated in response to a preset emergency event.

12. The mobile device management method of claim 11, wherein:
the profiles included in the first layer further include event policies in which the event occurring on the mobile device or the emergency event and identification codes of profiles activated in response to each event are defined, and
(b) is carried out so as to activate profiles of the second and third layers in response to occurrence of the event defined in the event policies.

13. The mobile device management method of claim 8, wherein:
(b) comprises:
(b1) calculating activation indices assigned to the respective profiles depending on initiation and termination of the event occurring on the mobile device;
(b2) calculating activation indices assigned to the respective profiles in response to an activation or deactivation command received from outside the mobile device; and
(b3) activating profiles, activation indices of which are equal to or greater than a preset reference value, among the plurality of profiles, based on the activation indices of the respective profiles calculated at (b1) and (b2).

14. The mobile device management method of claim 13, wherein, when activation indices are updated at (b1) or (b2), (b3) is carried out so as to reselect profiles to be activated from among the plurality of profiles based on the updated activation indices.

15. A mobile device, comprising:
a transmitter, a receiver, a storage, a management apparatus, and one or more mobile device functions;
wherein:
the receiver receives a plurality of profiles;
the profiles are stored in the storage;
the profiles each include one or more security policies and each have a respective activation priority;
each of the security policies pertains to an operation state of one of the mobile device functions;
the storage also includes a plurality of event policies that define events and corresponding profiles;
the management apparatus selectively activates ones of the profiles in response to at least one of:
a detection of one of the defined events, and
a command, received by the receiver, indicating one of the profiles to activate; and
when the management apparatus activates one of the profiles, the management apparatus also executes the one or more security policies of the activated profile, and the executed security policies control the operation state of the mobile device functions,
wherein each profile is assigned an activation index, and the management apparatus activates a profile of which the activation index is greater than a preset value,
wherein, when two or more events are defined with a corresponding profile in the storage, an activation index of the corresponding profile increases according to a number of events, among the two or more events, occurring on the mobile device, and
wherein, when the activated profile includes one of the security policies pertaining to the same one of the mobile device functions, the management apparatus executes only the one of the security policies belonging to the activated profile having the higher respective activation priority.

16. The mobile device as set forth in claim 15, wherein the profiles each belong to a respective one of a plurality of layers, each of the layers having a respective activation priority.

17. The mobile device as set forth in claim 16, wherein the layers include a base layer having an always active profile and an event-driven layer having profiles corresponding to the plurality of event policies.

* * * * *